(12) United States Patent
Ota et al.

(10) Patent No.: US 12,515,328 B2
(45) Date of Patent: Jan. 6, 2026

(54) CONVEYANCE SYSTEM, CONVEYANCE METHOD, AND PROGRAM

(71) Applicant: TOYOTA JIDOSHA KABUSHIKI KAISHA, Toyota (JP)

(72) Inventors: Junya Ota, Edogawa-ku (JP); Kunihiro Iwamoto, Nagakute (JP); Yutaro Takagi, Edogawa-ku (JP); Takatoshi Morimitsu, Toyota (JP); Uori Koike, Saitama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 217 days.

(21) Appl. No.: 18/337,779

(22) Filed: Jun. 20, 2023

(65) Prior Publication Data
US 2023/0405816 A1     Dec. 21, 2023

(30) Foreign Application Priority Data
Jun. 21, 2022    (JP) .................. 2022-099322

(51) Int. Cl.
  *B25J 9/16*    (2006.01)
  *B65G 1/02*    (2006.01)
(52) U.S. Cl.
  CPC ............ *B25J 9/1651* (2013.01); *B65G 1/026* (2013.01); *B65G 2203/025* (2013.01)
(58) Field of Classification Search
  CPC ....... B25J 9/1651; B25J 9/1679; B65G 1/026; B65G 2203/025; B65G 2207/40; B65G 1/04; B65G 1/02; B65G 1/0485; G05B 2219/40078; G05B 2219/40252; G05B 2219/40607; G05B 2219/45047
See application file for complete search history.

(56) References Cited

U.S. PATENT DOCUMENTS

2023/0110897 A1*   4/2023   Kansky .................. B25J 9/1664
                                                            700/253

FOREIGN PATENT DOCUMENTS

| JP | 2000-168914 A | 6/2000 |
| JP | 2018-24443 A | 2/2018 |
| WO | WO 2019-132012 A1 | 7/2019 |
| WO | WO 2021-241263 A1 | 12/2021 |

* cited by examiner

*Primary Examiner* — Dylan M Katz
(74) *Attorney, Agent, or Firm* — Finnegan, Henderson, Farabow, Garrett and Dunner LLP

(57) ABSTRACT

A conveyance system, a conveyance method, and a program reducing the possibility that an object that is accommodated in a box and is being conveyed is damaged are provided. A conveyance system conveys a box accommodating an object by conveyance robots. The conveyance system includes a first calculation unit configured to calculate, based on a kind and an arrangement of the object, a first maximum allowable acceleration indicating a maximum value of an allowable acceleration of the box in a width direction and a second maximum allowable acceleration indicating a maximum value of an allowable acceleration of the box in a depth direction.

6 Claims, 15 Drawing Sheets

|  | GLASS | HARD PLASTIC | PAPER | SOFT PLASTIC |
|---|---|---|---|---|
| GLASS | 10 | — | — | — |
| HARD PLASTIC | 5 | 2 | — | — |
| PAPER | 1 | 0.1 | 0 | — |
| SOFT PLASTIC | 0.1 | 0 | 0 | 0 |

Fig. 8

| DAMAGE RISK | 0 | 10 | 20 | 100 | 200 |
|---|---|---|---|---|---|
| MAXIMUM ALLOWABLE ACCELERATION | 10 | 5 | 3 | 1 | 0.3 |

Fig. 9

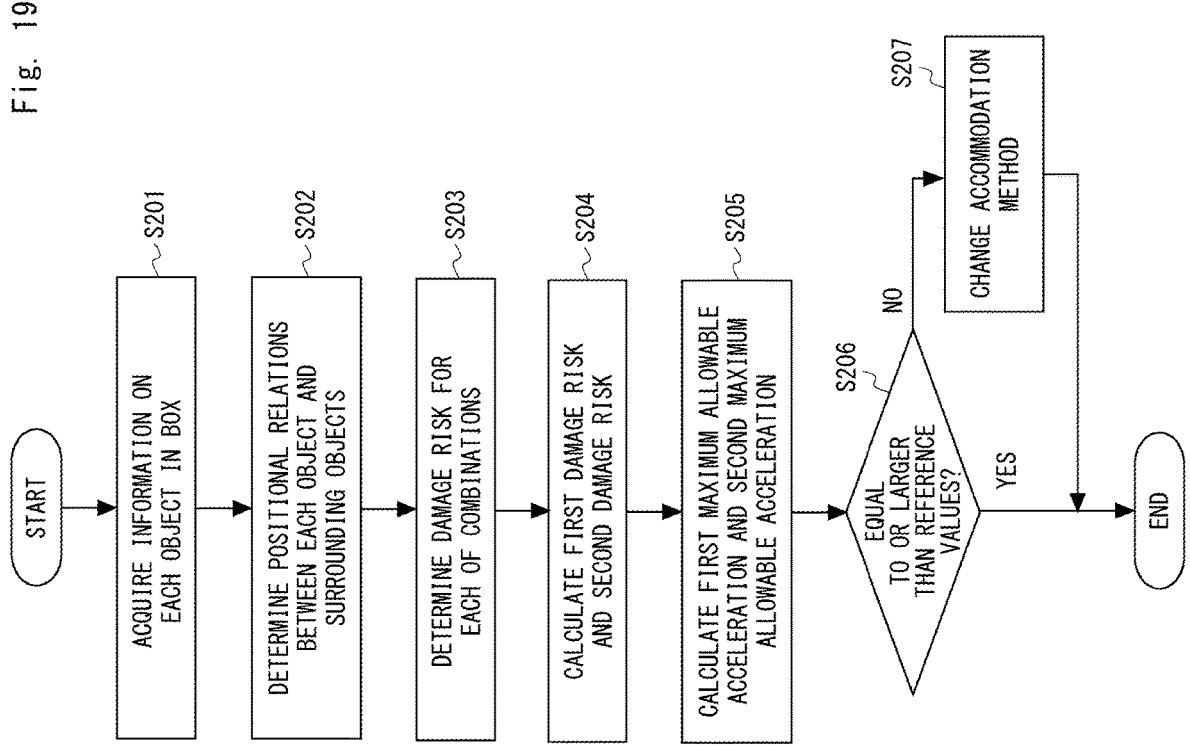

CONVEYANCE SYSTEM, CONVEYANCE METHOD, AND PROGRAM

CROSS REFERENCE TO RELATED APPLICATIONS

This application is based upon and claims the benefit of priority from Japanese patent application No. 2022-099322, filed on Jun. 21, 2022, the disclosure of which is incorporated herein in its entirety by reference.

BACKGROUND

The present disclosure relates to a conveyance system, a conveyance method, and a program.

International Patent Publication No. WO 2021/241263 discloses a conveyance apparatus that estimates fragility of a load from one of a center-of-gravity movement of the load, vibration characteristics of the load, and a sound generated in association with the movement of the load and sets a conveyance method based on the aforementioned information.

SUMMARY

In the technique disclosed in International Patent Publication No. WO 2021/241263, a robot conveying a load detects features of the load that it conveys, and then the conveyance method is changed based on the detected information. Therefore, it is impossible to reduce the possibility of the load being damaged before the conveyance method is changed.

The present disclosure has been made in order to solve the aforementioned problem, and an aim of the present disclosure is to provide a conveyance system, a conveyance method, and a program capable of reducing the possibility of objects that are accommodated in a box and are being conveyed being damaged.

A conveyance system according to this embodiment is a conveyance system for conveying a box accommodating an object by a conveyance robot, the conveyance system including a first calculation means for calculating, based on a kind and an arrangement of the object, a first maximum allowable acceleration indicating a maximum value of an allowable acceleration of the box in a width direction and a second maximum allowable acceleration indicating a maximum value of an allowable acceleration of the box in a depth direction.

A conveyance method according to this embodiment is a conveyance method for conveying a box accommodating an object by a conveyance robot, the conveyance method including calculating, based on a kind and an arrangement of the object, a first maximum allowable acceleration indicating a maximum value of an allowable acceleration of the box in a width direction and a second maximum allowable acceleration indicating a maximum value of an allowable acceleration of the box in a depth direction.

A program according to this embodiment causes a computer to execute the aforementioned conveyance method.

According to the present disclosure, it is possible to provide a conveyance system, a conveyance method, and a program capable of reducing the possibility that objects that are accommodated in a box and are being conveyed are damaged.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 8 is a diagram for describing a method for calculating a damage risk;

FIG. 9 is a diagram for describing a method for calculating a first maximum allowable acceleration and a second maximum allowable acceleration;

FIG. 19 is a flowchart showing a flow of a method for changing a method for accommodating objects.

DESCRIPTION OF EMBODIMENTS

Hereinafter, with reference to embodiments, the present disclosure will be described. However, the disclosure according to the claims is not limited to the following embodiments. Further, not all the components described in the embodiments are necessary for solving the problem.

First Embodiment

Figure 1:
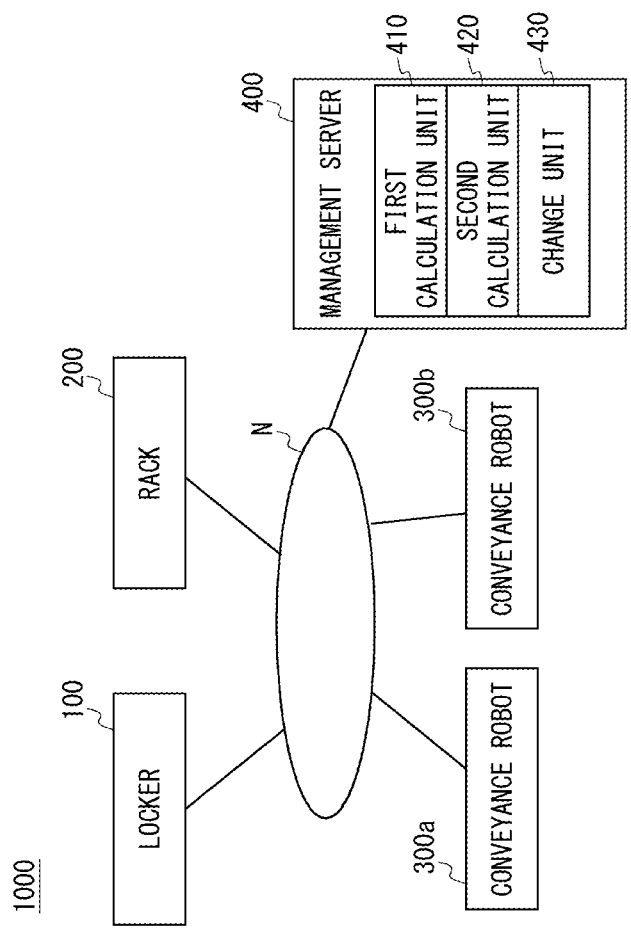
FIG. 1 is a schematic view showing a configuration of a conveyance system according to a first embodiment.

Hereinafter, with reference to the drawings, a conveyance system according to a first embodiment will be described. FIG. 1 is a schematic view showing a configuration of a conveyance system 1000 according to the first embodiment. The conveyance system 1000 includes a locker 100, a rack 200, a conveyance robot 300a, a conveyance robot 300b, and a management server 400. The locker 100, the rack 200, the conveyance robot 300a, the conveyance robot 300b, and the management server 400 are connected to one another in such a way that they can communicate with one another via a network N. The network N may be a wired network or a wireless network.

The locker 100 is configured to be able to accommodate a box accommodating objects and is installed at the entrance or the like of a house. The rack 200 is also configured to be able to accommodate a box accommodating objects. The rack 200 is installed in the house or the like. The rack 200 includes a sorting robot that sorts the objects.

The conveyance robot 300a is smaller than the conveyance robot 300b and conveys boxes mainly in a house. The conveyance robot 300a takes out a box accommodated in the locker 100 and stores the box in the rack 200. The conveyance robot 300a also takes out a box accommodated in the rack 200 and stores the box in the locker 100.

The conveyance robot 300b, which is larger than the conveyance robot 300a, mainly conveys a box outside the house. The conveyance robot 300b conveys a box from a conveyance source (e.g., a warehouse) to each house and stores the box in the locker 100. Further, the conveyance robot 300b may take out a box from the locker 100 and convey the box to a conveyance destination. The conveyance robot 300a may convey a box from the rack 200 to the locker 100 and the conveyance robot 300b may convey the box from the locker 100 to an outside (e.g., a warehouse). The box may be conveyed to the outside when, for example, objects are replenished in the box or when objects are returned.

The management server 400 is a server that manages the conveyance system 1000. The management server 400 calculates a maximum value of an allowable acceleration of a box based on the kinds and arrangement of objects accommodated in the box. The conveyance robots 300a and 300b travel based on the results of the calculation, whereby it is possible to reduce the possibility that the objects accommodated in the box are damaged. Further, the management server 400 includes a function of changing a method for accommodating the objects in the box (e.g., whether or not a partition is provided or the orientation of the objects).

Each of the rack 200, the conveyance robot 300a, the conveyance robot 300b, and the management server 400 includes, for example, a computation unit such as a Central Processing Unit (CPU) and a storage unit such as a Random Access Memory (RAM) or a Read Only Memory (ROM) storing various kinds of control programs, data, and the like. That is, each of the rack 200, the conveyance robot 300a, the conveyance robot 300b, and the management server 400 has a function as a computer and performs processing based on the above various control programs or the like.

The processing by the management server 400 may be executed on the side of the rack 200, the conveyance robot 300a, and the conveyance robot 300b. Therefore, the conveyance system 1000 according to the first embodiment may not include the management server 400.

Figure 2:
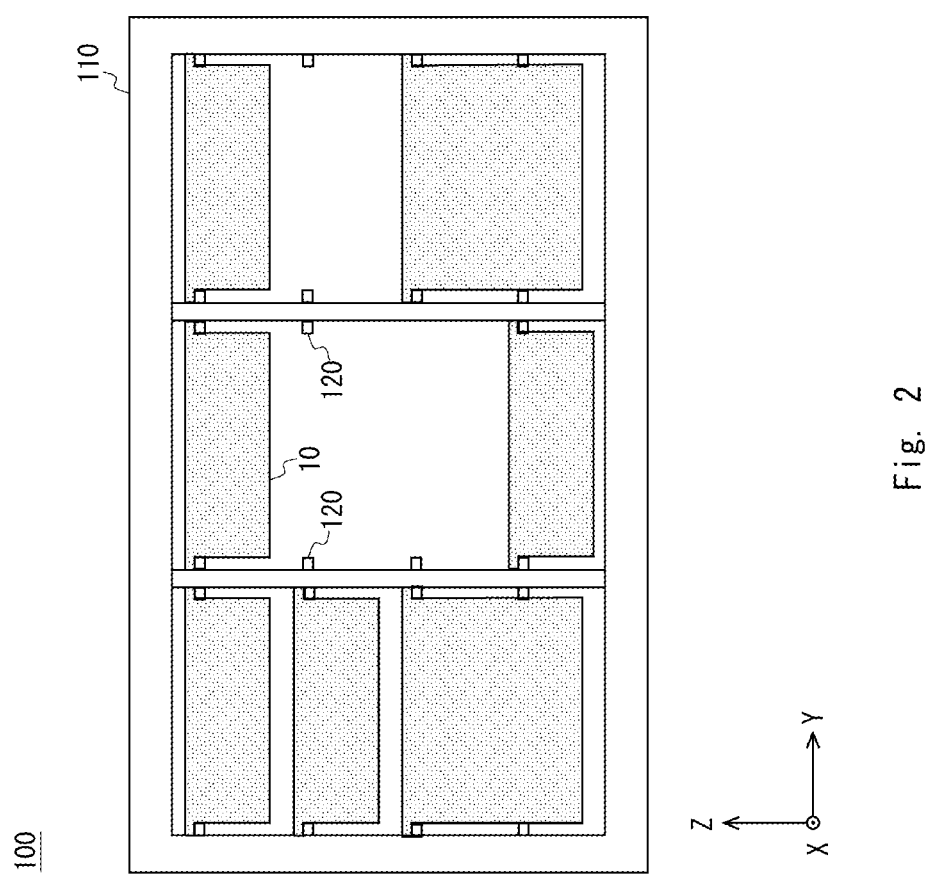
FIG. 2 is a schematic front view of a locker according to the first embodiment.

Referring next to FIG. 2, the locker 100 will be described. FIG. 2 is a schematic front view of the locker 100. As a matter of course, the right-handed XYZ orthogonal coordinates shown in FIG. 2 and the other drawings are indicated for convenience to describe the positional relationship of the components. Generally, the Z-axis positive direction is vertically upward and the XY-plane is a horizontal plane, which is the same throughout the drawings. The locker 100 includes a housing 110 and a plurality of pairs of rails 120. In order to facilitate understanding, boxes 10 are hatched.

The housing 110 includes a top plate provided on the side in the Z-axis positive direction, a bottom plate provided on the side in the Z-axis negative direction, and side plates provided on the sides in the Y-axis positive direction and the Y-axis negative direction. The front surface or the back surface of the housing 110 may be provided with a door that can be opened and closed. In this case, the locker 100 may include a function of opening and closing the door in response to a request from the management server 400.

The plurality of pairs of rails 120 are extended in the depth direction (X-axis direction) and provided in the height direction (Z-axis direction) at equal intervals inside the housing 110. A plurality of boxes 10 are accommodated along the plurality of pairs of rails 120.

Figure 3:
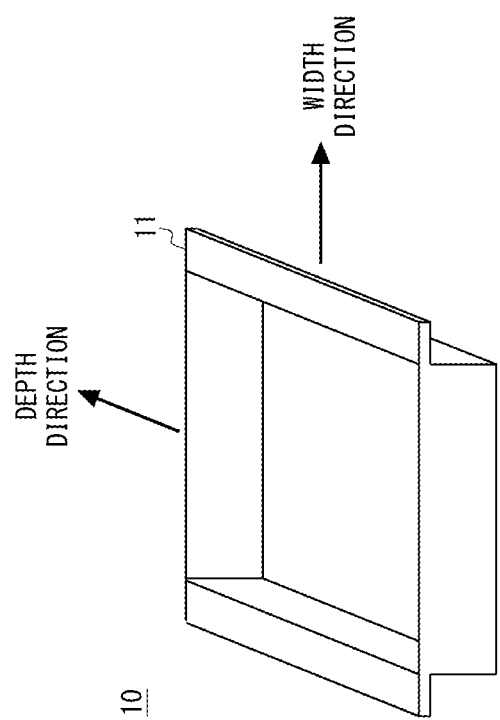
FIG. 3 is a perspective view of a box according to the first embodiment.

FIG. 3 is a schematic perspective view of the box 10. With reference to FIGS. 2 and 3, the box 10 includes projecting parts 11 which project in the width direction (Y-axis direction) of the box 10. The projecting parts 11 are extended in the depth direction (X-axis direction) of the box 10. One of the projecting parts 11 is supported by one of the pair of rails 120 and the other one of the projecting parts 11 is supported by the other one of the pair of rails 120. Note that the bottom surface of the box 10 may be supported by the pair of rails 120. In this case, the box 10 may not include the projecting parts 11.

Figure 4:
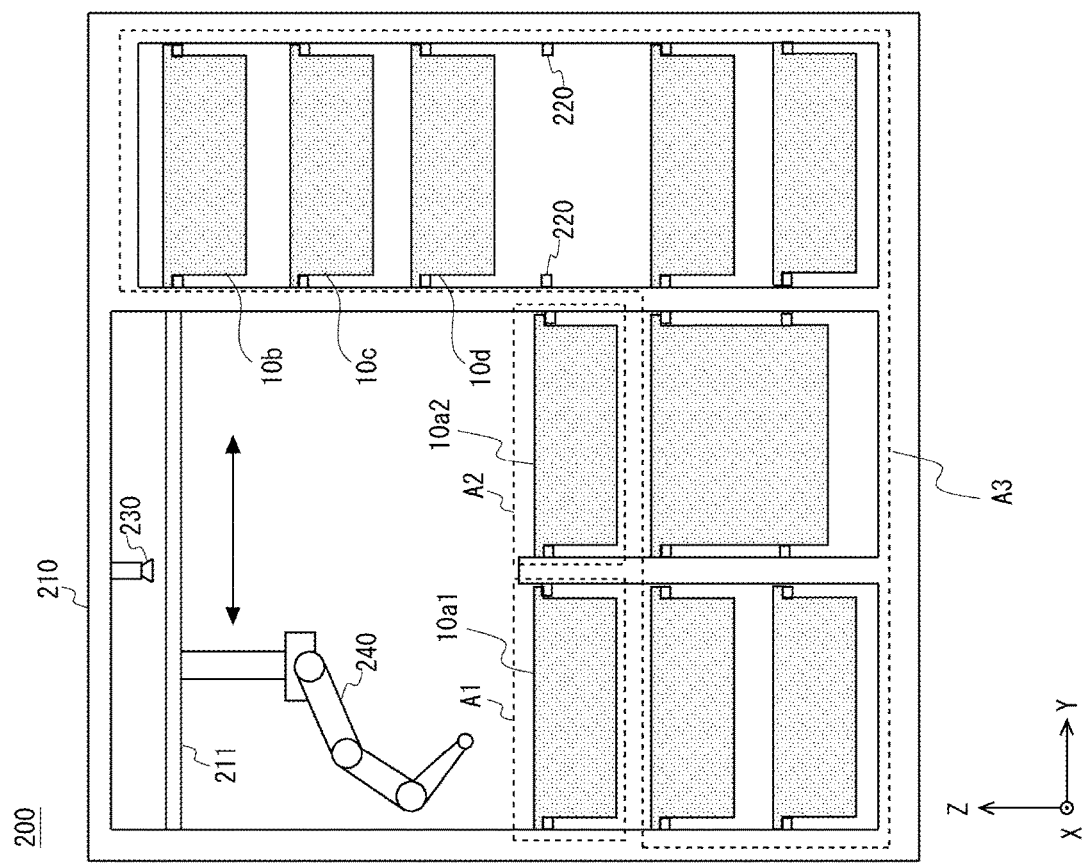
FIG. 4 is a schematic front view of a rack according to the first embodiment.

Referring next to FIG. 4, the rack 200 will be described. FIG. 4 is a schematic front view of the rack 200. The rack 200 includes a housing 210, a plurality of pairs of rails 220, a camera 230, and a sorting robot 240.

Like the housing 110, the housing 210 includes a top plate provided on the side in the Z-axis positive direction, a bottom plate provided on the side in the Z-axis negative direction, and side plates provided on the sides in the Y-axis positive direction and the Y-axis negative direction. The housing 110 further includes a guide rail 211 for attaching the sorting robot 240. Further, the camera 230 is attached to the top plate. Since the configuration of the plurality of pairs of rails 220 is similar to that of the plurality of pairs of rails 120, the descriptions thereof will be omitted.

Like the locker 100, the rack 200 is configured to be able to accommodate a plurality of boxes 10. The rack 200 includes an accommodation area A1, an accommodation area A2, and an accommodation area A3. The accommodation area A1 is an area where a box 10a1 is accommodated, the accommodation area A2 is an area where a box 10a2 is accommodated. The accommodation area A3 is an area other than the accommodation areas A1 and A2. The accommodation area A3 accommodates boxes 10b, 10c, and 10d.

The accommodation area A1 and the accommodation area A2 are areas that the sorting robot 240 can approach. Boxes before sorting are arranged in one of the accommodation area A1 and the accommodation area A2 and boxes after sorting are arranged in the other one of them. In the following description, a case in which the boxes before sorting are arranged in the accommodation area A1 and the boxes after sorting are arranged in the accommodation area A2 will be described. In this case, a plurality of different kinds of objects are stored in the box 10a1 or objects of a plurality of users are stored in the box 10a1 in a mixed manner. The box 10a1 may be a box conveyed from outside.

On the other hand, in the accommodation area A3, boxes, each accommodating a predetermined kind of object, or boxes, each accommodating objects of a predetermined user, are arranged. For example, the box 10b accommodates emergency supplies, the box 10c accommodates kitchen goods, and the box 10d accommodates cleaning supplies. The box 10b accommodates objects used by a father, the box 10c accommodates objects used by a mother, and the box accommodates objects used by a child. When a box accommodated in the accommodation area A3 is to be replenished with objects, this box is taken out and stored in the accommodation area A2, and then this box is replenished with the objects by the sorting robot 240.

The camera 230 is attached to the top plate or the like of the housing 210. The camera 230 captures an image of objects accommodated in the boxes 10a1 and 10a2.

The sorting robot 240, which is attached to the guide rail 211, can move in the Y-axis direction as shown by a double-sided arrow. The sorting robot 240 includes a robot arm and a robot hand. The robot hand may be an adsorption hand or may be a grip hand.

The sorting robot 240 moves an object from the box 10a1 to the box 10a2. The sorting robot 240 is able to recognize the object using the image captured by the camera 230. After the object is moved, the box 10a2 is stored in the accommodation area A3 in the rack 200 by the conveyance robot 300a. The sorting robot 240 may move the box 10.

The sorting robot 240 moves an object from the box 10a1 to the box 10a2 in accordance with an instruction from the management server 400. Further, the sorting robot 240 performs processing of changing the orientation of an object accommodated in the box 10a2 or adding a partition inside the box 10a2 in accordance with an instruction from the management server 400. Specific processing performed by the management server 400 will be described later.

Figure 5:
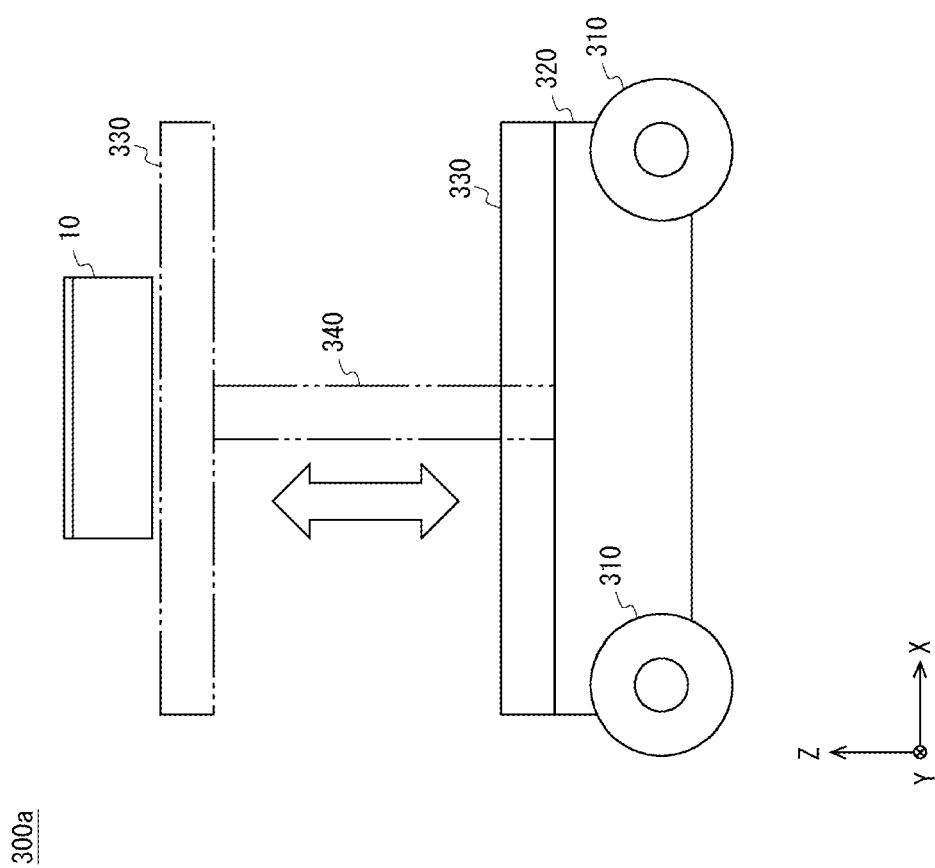
FIG. 5 is a schematic side view of a conveyance vehicle according to the first embodiment.

Referring next to FIG. 5, a configuration of the conveyance robot 300a will be described. FIG. 5 is a schematic side view of the conveyance robot 300a. The conveyance robot 300a includes wheels 310, a main body part 320, a top plate 330, and a support column 340. The two pairs of wheels 310, which are fixed to the lower side of the main body part 320 in such a way that they are rotatable, are driven by a drive source (not shown) such as a motor.

As shown in FIG. 5, the top plate 330 is coupled to the main body part 320 via a support column 340 that can be extended or contracted. The top plate 330 is coupled to the upper end of the support column 340. The conveyance robot 300a places a box 10 on the top plate 330 and conveys the box 10.

The support column 340 has, for example, a telescopic type extension and contraction mechanism, and is extended and contracted by a drive source (not shown) such as a motor. As shown by the white arrow, the height of the top plate 330 can be changed by changing the length of the support column 340. Accordingly, the conveyance robot 300a can take boxes 10 in accommodation areas having different heights and take out boxes 10 from the accommodation areas having different heights. The conveyance robot 300a is able to move a box 10 from the locker 100 and the rack 200 to the top plate 330 using a manipulator (not shown). Further, the conveyance robot 300a is able to move the box 10 from the top plate 330 to the locker 100 and the rack 200 using the manipulator.

The conveyance robot 300a receives a first maximum allowable acceleration indicating a maximum value of an allowable acceleration of the box 10 in the width direction (e.g., Y direction) and a second maximum allowable acceleration indicating a maximum value of an allowable acceleration of the box 10 in the depth direction (e.g., X direction) from the management server 400. The conveyance robot 300a conveys the box 10 in such a way that, for example, the acceleration in the Y direction becomes equal to or smaller than the first maximum allowable acceleration and the acceleration in the X direction becomes equal to or smaller than the second maximum allowable acceleration. Accordingly, it is possible to reduce the possibility that the objects accommodated in the box 10 are damaged.

Figure 6:
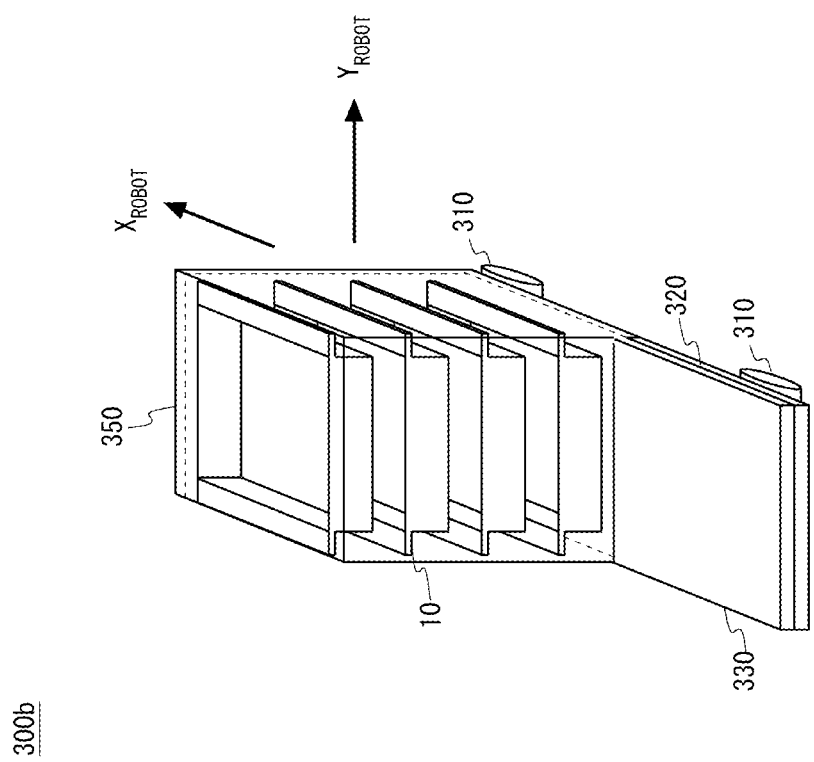
FIG. 6 is a perspective view of the conveyance vehicle according to the first embodiment.

Referring next to FIG. 6, the conveyance robot 300b will be described. The conveyance robot 300b includes wheels 310, a main body part 320, a top plate 330, a support column (not shown), and an accommodation part 350. FIG. 6 shows a state in which the support column is contracted. Like the locker 100 and the rack 200, the accommodation part 350 includes a plurality of pairs of rails that are not shown, and is configured to be able to accommodate a plurality of boxes 10.

The conveyance robot 300b moves a box 10 from the locker 100 to the top plate 330 using a manipulator (not shown) and stores the box placed on the top plate 330 in the accommodation part 350. The conveyance robot 300b is able to store the boxes 10 in a plurality of accommodation areas of the accommodation part 350 by changing the height of the top plate 330. Further, the conveyance robot 300b draws the box 10 from the accommodation part 350 and places the box 10 on the top plate 330 using a manipulator (not shown), and stores the box 10 placed on the top plate in the locker 100.

Note that the conveyance robot 300a may store the boxes 10 in the accommodation part 350 of the conveyance robot 300b and take out the boxes 10 from the accommodation part 350. In this case, the conveyance robot 300b may not include a manipulator.

An $X_{ROBOT}$ direction shown in FIG. 6 shows the traveling direction of the conveyance robot 300b. A $Y_{ROBOT}$ direction shows the width direction of the conveyance robot 300b. While the $X_{ROBOT}$ direction and the depth direction of the boxes 10 match each other in FIG. 6, the $Y_{ROBOT}$ direction and the depth direction of the boxes 10 may match each other. The accommodation part 350 may accommodate both the boxes 10 whose depth direction matches the $X_{ROBOT}$ direction and the boxes 10 whose depth direction matches the $Y_{ROBOT}$ direction.

The conveyance robot 300b receives a third maximum allowable acceleration indicating a maximum value of an allowable acceleration in the $Y_{ROBOT}$ direction and a fourth maximum allowable acceleration indicating a maximum value of an allowable acceleration in the $X_{ROBOT}$ direction from the management server 400. The conveyance robot 300b travels in such a way that the acceleration in the $Y_{ROBOT}$ direction becomes equal to or smaller than the third maximum allowable acceleration and the acceleration in the $X_{ROBOT}$ direction becomes equal to or smaller than the fourth maximum allowable acceleration. The third maximum allowable acceleration and the fourth maximum allowable acceleration may be calculated based on the first maximum allowable acceleration and the second maximum allowable acceleration of each of the plurality of boxes accommodated in the accommodation part 350.

Referring next to FIG. 1, the function of the management server 400 will be described. The management server 400 includes a first calculation unit 410, a second calculation unit 420, and a change unit 430.

The first calculation unit 410 calculates the first maximum allowable acceleration and the second maximum allowable acceleration based on the kinds and the arrangement of objects accommodated in a box 10. Specifically, the first calculation unit 410 determines a risk that an object might be damaged when the object has moved in the width direction of the box 10 (this risk will be referred to as a first damage risk) and calculates the first maximum allowable acceleration based on the first damage risk. Likewise, the first calculation unit 410 determines a risk that an object might be damaged when the object has moved in the depth direction of the box 10 (this risk will be referred to as a second damage risk) and calculates the second maximum allowable acceleration. The damage risk may be a risk that at least one of the two objects that collide with each other might be damaged.

The first damage risk and the second damage risk are evaluated based on an estimated collision speed and a fragility of two objects that collide with each other. The estimated collision speed indicates an estimated speed when two objects collide with each other. The estimated collision speed may be calculated based on the assumption that a predetermined acceleration (e.g., a unit acceleration) is being applied. The estimated collision speed is specifically calculated based on how easy each object rolls in view of the shape of each object. Further, the fragility of each object is evaluated based on the material of each object. The estimated collision speed may be calculated based on how easy each object slides. In this case, information regarding the material of each object may be taken into account.

Figure 7:
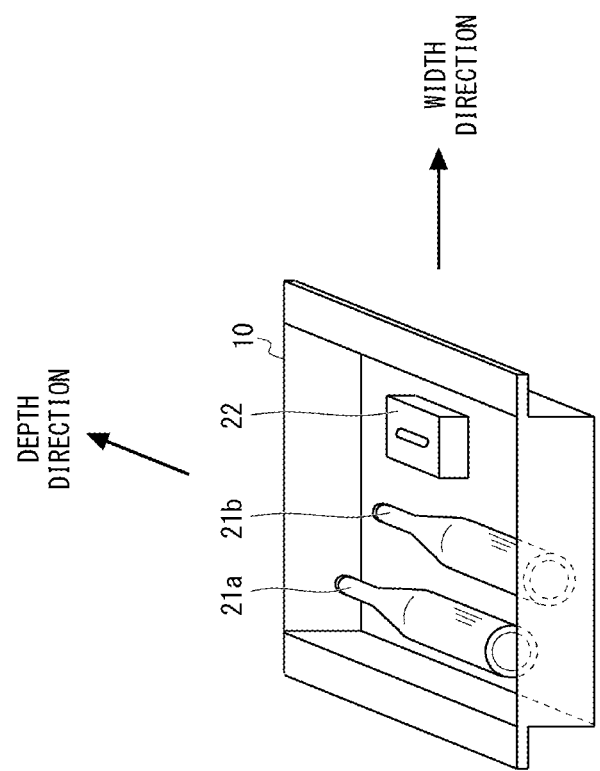
FIG. 7 is a diagram for describing a method for calculating a damage risk.

Referring next to FIG. 7, a method for calculating the first damage risk and the second damage risk will be specifically described. The box 10 accommodates a bottle 21a, a bottle 21b, and a tissue box 22. The bottle 21a and the bottle 21b each have such a shape that it is likely to roll in the width direction of the box 10 and it is unlikely to roll in the depth direction. The tissue box 22 has such a shape that it is unlikely to roll in the width direction and the depth direction of the box 10. The material of the bottle 21a and the bottle 21b is glass. The material of the tissue box 22 is paper. Further, the material of the box 10 is plastic. In the following description, the material of the box 10 is called hard plastic and the material of a plastic bag is called soft plastic.

In the width direction of the box 10, the bottle 21a may collide with the bottle 21b and the bottle 21b may collide with the tissue box 22. In the depth direction of the box 10, the bottle 21a may collide with the wall of the box 10, the bottle 21b may collide with the wall of the box 10, and the tissue box 22 may collide with the wall of the box 10.

When the first damage risk is calculated, the estimated collision speed of objects that may collide with each other in the width direction and the fragility thereof are taken into account. When the second damage risk is calculated, the estimated collision speed of the objects that may collide with each other in the depth direction and the fragility thereof are taken into account. The estimated collision speed is calculated based on the estimated speed for each object. The estimated speed may be a relative speed when seen from the box 10. The fragility is evaluated based on a table showing the fragility of the objects.

For example, the estimated speed of the bottles 21a and 21b in the width direction is determined to be "10" and the estimated speed thereof in the depth direction is determined to be "1". Further, the estimated speed of the tissue box 22 in the width direction is assumed to be "2" and the estimated speed thereof in the depth direction is assumed to be "2". The estimated speed may be the speed assumed when a predetermined acceleration is added.

FIG. 8 is a table showing the fragility for each of combinations of the materials of objects. In this table, the fragility when glass collides with glass is "10", the fragility when glass collides with hard plastic is "5", the fragility when glass collides with paper is "1", and the fragility when glass collides with soft plastic is "0.1". Further, the fragility when hard plastic collides with hard plastic is "2", the fragility when hard plastic collides with paper is "0.1", and the fragility when hard plastic collides with soft plastic is "0". Further, the fragility when paper collides with paper, the fragility when paper collides with soft plastic, and the fragility when soft plastic collides with soft plastic is "0".

With reference to FIGS. 7 and 8, first, the first damage risk will be described. The estimated collision speed when the bottle 21a collides with the bottle 21b is "20", which is calculated by adding "10", which is the estimated speed of the bottle 21a, and "10", which is the estimated speed of the bottle 21b. The estimated collision speed may instead be calculated by performing computation other than addition. The fragility when the bottle 21a collides with the bottle 21b is "10", which is the fragility when glass collides with glass. Therefore, the damage risk when the bottle 21a collides with the bottle 21b is calculated to be 20*10=200. The damage risk may be calculated by performing computation other than multiplication.

Likewise, the estimated collision speed when the bottle 21b collides with the tissue box 22 is "12", which is calculated by adding "10", which is the estimated speed of the bottle 21b, and "2", which is the estimated speed of the tissue box 22. The fragility when the bottle 21b collides with the tissue box 22 is "1", which is the fragility when glass collides with paper. Therefore, the damage risk when the bottle 21b collides with the tissue box 22 is calculated to be 12*1=12.

The first damage risk is calculated to be "200" by calculating the maximum value from "200", which is the damage risk when the bottle 21a collides with the bottle 21b, and "12", which is the damage risk when the bottle 21b collides with the tissue box 22. The method for calculating the first damage risk is not limited to the computation of the maximum value.

Likewise, the second damage risk will be described. The estimated collision speed when the bottle 21a collides with the box 10 is "1", which is calculated by adding "1", which is the estimated speed of the bottle 21a, and "0", which is the estimated speed of the box 10. The fragility of the bottle 21a is "5", which is the fragility when glass collides with hard plastic. Therefore, the damage risk when the bottle 21a collides with the box 10 is calculated to be 1*5=5. While the detailed descriptions will be omitted, the damage risk when the bottle 21b collides with the box 10 is calculated to be "5" and the damage risk when the tissue box 22 collides with the box 10 is calculated to be "0.2".

The second damage risk is calculated to be "5" by calculating the maximum value from "5", which is the damage risk when the bottle 21a collides with the box "5", which is the damage risk when the bottle 21b collides with the box 10, and "0.2", which is the damage risk when the tissue box 22 collides with the box 10.

Referring next to FIG. 9, a method for calculating the first maximum allowable acceleration from the first damage risk (e.g., "12") and calculating the second maximum allowable acceleration from the second damage risk (e.g., "0.2") will be described. For example, the first maximum allowable acceleration is calculated to be "10" when the first damage risk is 0 or larger but smaller than 10, calculated to be "5" when the first damage risk is 10 or larger but smaller than 20, calculated to be "3" when the first damage risk is 20 or larger but smaller than 100, calculated to be "1" when the first damage risk is 100 or larger but smaller than 200, and calculated to be "0.3" when the first damage risk is 200 or larger. The second maximum allowable acceleration is calculated based on the second damage risk in a method similar to that described above. When, for example, the first damage risk is "200", the first maximum allowable acceleration is calculated to be "0.3". When the second damage risk is "5", the second maximum allowable acceleration is calculated to be "10".

The conveyance robot 300a conveys the box 10 by setting the acceleration of the box 10 in the width direction to be equal to or smaller than the first maximum allowable acceleration and setting the acceleration of the box 10 in the depth direction to be equal to or smaller than the second maximum allowable acceleration, whereby the risk that the objects accommodated in the box 10 might be damaged can be reduced.

Referring next to FIG. 1, the second calculation unit 420 of the management server 400 will be described. The second calculation unit 420 calculates the maximum value of the allowable acceleration of the conveyance robot 300b in the width direction (third maximum allowable acceleration) and the maximum value of the allowable acceleration of the conveyance robot 300b in the traveling direction (fourth maximum allowable acceleration). The second calculation unit 420 calculates the third maximum allowable acceleration and the fourth maximum allowable acceleration based on the first maximum allowable acceleration and the second maximum allowable acceleration of each of the plurality of boxes 10 accommodated in the conveyance robot 300b.

With reference to FIGS. 6 to 10, a method for calculating the third maximum allowable acceleration and the fourth maximum allowable acceleration will be specifically described. It is assumed that the conveyance robot 300b accommodates boxes A-D as the boxes 10. It is assumed that the first maximum allowable acceleration of the box A is "3.0" and the second maximum allowable acceleration of the box A is "3.0". It is assumed that the first maximum allowable acceleration of the box B is "2.0" and the second maximum allowable acceleration of the box B is "2.0". It is assumed that the first maximum allowable acceleration of the box C is "1.5" and the second maximum allowable acceleration of the box C is "2.0". It is assumed that the first maximum allowable acceleration of the box D is "1.0" and the second maximum allowable acceleration of the box D is "2.5".

Figure 10:
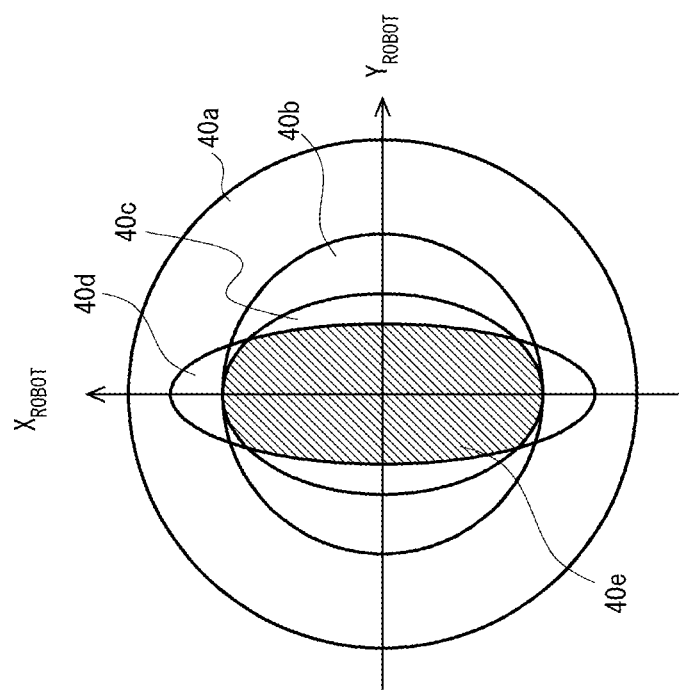
FIG. 10 is a diagram for describing a method for calculating a third maximum allowable acceleration and a fourth maximum allowable acceleration.

The vertical axis (this axis will be referred to as an $X_{ROBOT}$ axis) in FIG. 10 indicates the acceleration of the conveyance robot 300b in the traveling direction ($X_{ROBOT}$ direction). The horizontal axis (this axis will be referred to as a $Y_{ROBOT}$ axis) indicates the acceleration of the conveyance robot 300b in the width direction ($Y_{ROBOT}$ direction). A region 40a indicates the allowable acceleration when the box A is conveyed, and is determined from the first maximum allowable acceleration and the second maximum allowable acceleration of the box A. When the acceleration of the conveyance robot 300b is included in the region 40a, the risk that objects accommodated in the box A might be damaged is sufficiently low.

With reference to FIG. 6, the $X_{ROBOT}$ direction matches the depth direction of the boxes A-D. In this case, the intersection of the curved line that surrounds the region 40a with the $Y_{ROBOT}$ axis indicates the first maximum allowable acceleration of the box A and the intersection of the curved line that surrounds the region 40a with the $X_{ROBOT}$ axis indicates the second maximum allowable acceleration of the box A. On the other hand, when the $X_{ROBOT}$ direction is the width direction of the box A, the intersection of the curved line that surrounds the region 40a with the $Y_{ROBOT}$ axis indicates the second maximum allowable acceleration of the box A and the intersection of the curved line that surrounds the region 40a with the $X_{ROBOT}$ axis indicates the first maximum allowable acceleration of the box A.

Likewise, a region 40b indicates the allowable acceleration when the box B is conveyed, a region 40c indicates the allowable acceleration when the box C is conveyed, and a region 40d indicates the allowable acceleration when the box D is conveyed.

A region 40e indicates the allowable acceleration of the conveyance robot 300b. The region 40e is a common part of the regions 40a, 40b, 40c, 40d, and 40e. When the acceleration of the conveyance robot 300b is included in the region 40e, the risk that the objects contained in the boxes A-D might be damaged is sufficiently low.

When the $X_{ROBOT}$ direction matches the depth direction of the boxes A-D, the intersection of the curved line that surrounds the region 40e with the $Y_{ROBOT}$ axis indicates the third maximum allowable acceleration and the intersection of the curved line that surrounds the region 40e with the $X_{ROBOT}$ axis indicates the fourth maximum allowable acceleration. Therefore, the third maximum allowable acceleration becomes "1.0" from the minimum value of the first maximum allowable accelerations "3.0", "2.0", "1.5", and "1.0" of the respective boxes A-D. The fourth maximum allowable acceleration becomes "2.0" from the minimum value of the second maximum allowable accelerations "3.0", "2.0", "2.0", and "2.5" of the respective boxes A-D.

Figure 11:
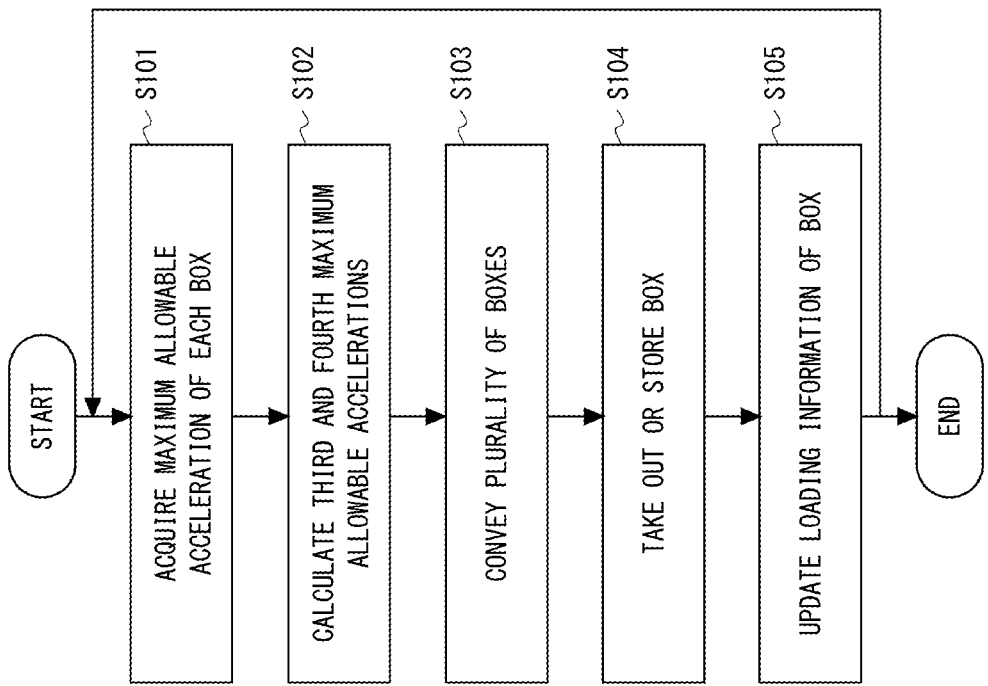
FIG. 11 is a flowchart showing a flow of a method for calculating the third maximum allowable acceleration and the fourth maximum allowable acceleration.

Referring next to FIG. 11, a flow of the conveyance method by the conveyance robot 300b will be described. First, the first maximum allowable acceleration and the second maximum allowable acceleration of each of the plurality of boxes accommodated in the conveyance robot 300b are acquired (Step S101).

Next, the maximum allowable acceleration of the conveyance robot 300b in the width direction (the third maximum allowable acceleration) and the maximum allowable acceleration of the conveyance robot 300b in the traveling direction (the fourth maximum allowable acceleration) are calculated (Step S102).

Next, the conveyance robot 300b conveys a plurality of boxes 10 (Step S103). When the conveyance robot 300b arrives at a destination, a box 10 is taken out from the conveyance robot 300b or a new box 10 is stored in the conveyance robot 300b (Step S104). For example, of the boxes A-D, the box D is taken out or a new box E is stored.

Next, information regarding the boxes 10 accommodated in the conveyance robot 300b (this information will be referred to as loading information) is updated (Step S105) and the process returns to the processing of Step S101. When, for example, the box D of the boxes A-D has been taken out, the third maximum allowable acceleration and the fourth maximum allowable acceleration are updated based on the first maximum allowable acceleration and the second maximum allowable acceleration of the boxes A-C. When the box E is stored, the third maximum allowable acceleration and the fourth maximum allowable acceleration are updated based on the first maximum allowable acceleration and the second maximum allowable acceleration of the boxes A-E.

Accordingly, the conveyance robot 300b that conveys a plurality of boxes 10 is able to quickly convey objects while reducing the possibility of the objects being damaged.

With reference to FIG. 1, the change unit 430 of the management server 400 will be described. The change unit 430 changes, when the first maximum allowable acceleration is small, a method for accommodating objects so that the first maximum allowable acceleration becomes large and changes, when the second maximum allowable acceleration is small, a method for accommodating objects so that the second maximum allowable acceleration becomes large. Specifically, when the first maximum allowable acceleration is smaller than a first reference value, the method for accommodating the objects is changed in such a way that the first maximum allowable acceleration becomes large. On the other hand, when the second maximum allowable acceleration is smaller than a second reference value, the method for accommodating the objects is changed in such a way that the second maximum allowable acceleration becomes large. The first reference value and the second reference value may be different from each other.

The change unit 430 adds, for example, a partitioning member (e.g., a block or a bar) that limits the movement of the objects and a buffer material in the box 10. The buffer material is not limited to a special-purpose object and may be another object (e.g., food in a packaging container) or a plastic bag. Further, the change unit 430 may change the orientation in which the objects are arranged. By changing the orientation of the objects, the aforementioned estimated speed in each direction can be changed. Therefore, the first maximum allowable acceleration and the second maximum allowable acceleration can be changed. The change unit 430 may acquire information regarding the materials and the shapes of the objects accommodated in the box 10 based on an image captured by the camera 230 and change the accommodation method based on the result of the acquisition.

The change unit 430 outputs information regarding the changed accommodation method to the sorting robot 240. The sorting robot 240 accommodates objects in a box according to the accommodation method changed by the change unit 430. The sorting robot 240 may arrange a partitioning member in the box 10.

Figure 12:
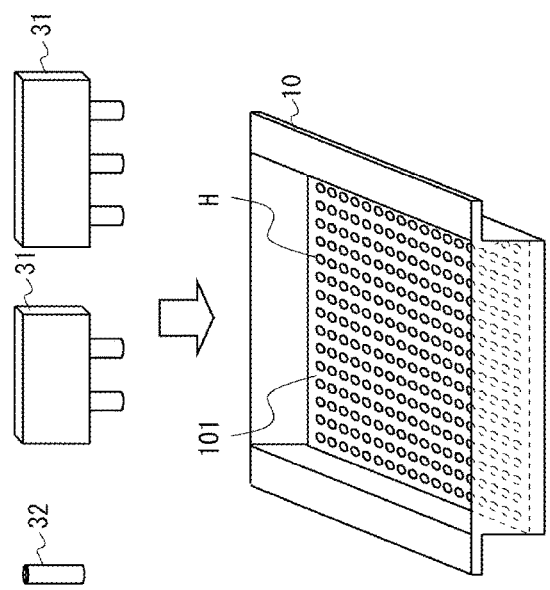
FIG. 12 is a diagram for describing a method for accommodating objects.

Referring next to FIGS. 12 to 18, a method for accommodating objects in the box 10 in such a way that the first maximum allowable acceleration and the second maximum allowable acceleration become large will be specifically described. In FIG. 12, a board 101 in which a plurality of holes H are formed is placed at the bottom of the box 10. Blocks 31 having convex parts that mate with the holes H and rod-shaped members 32 that mate with the holes H are used as partitions. The sorting robot 240 may accommodate the objects after the board 101 is placed in the box 10. Note that the holes or irregularities may be directly formed at the bottom of the box 10.

Figure 13:
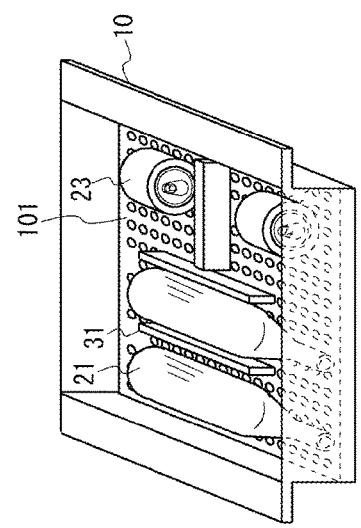
FIG. 13 is a diagram for describing a method for accommodating objects.

With reference to FIG. 13, the blocks 31 are arranged so as to limit a rotational movement of a bottle 21. Further, the blocks 31 are arranged so as to limit a movement of a can 23. By using the board 101, the blocks 31 can be arranged at desired places of the bottom surface of the box 10.

Figure 14:
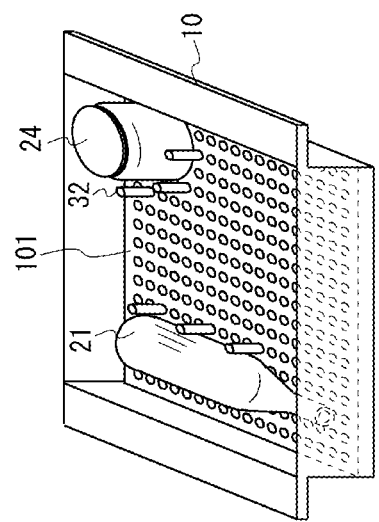
FIG. 14 is a diagram for describing a method for accommodating objects.

With reference to FIG. 14, a plurality of rod-shaped members 32 are arranged so as to limit a rotational movement of a bottle 21. Further, the plurality of rod-shaped members 32 are arranged so as to limit a movement of a small bottle 24. By using the board 101, the rod-shaped members 32 can be arranged at desired places of the bottom surface of the box 10.

Figure 15:
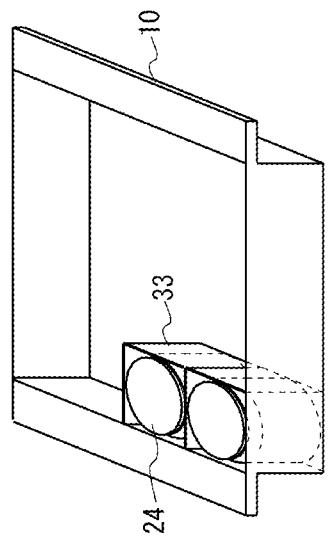
FIG. 15 is a diagram for describing a method for accommodating objects.

Partitions may be provided instead of the boards 101. With reference to FIG. 15, small bottles 24 are placed upright in the box 10 and partitions 33 are arranged so as to surround the small bottles 24. This limits the movement of the small bottles 24.

Figure 16:
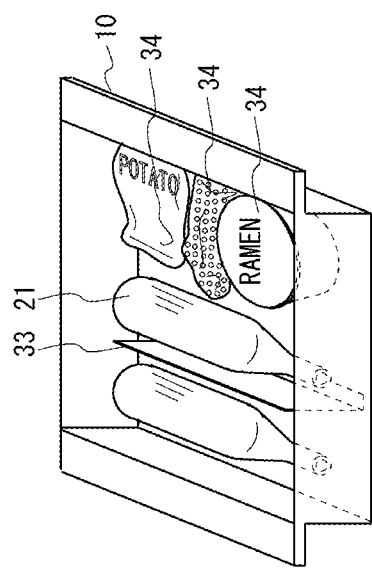
FIG. 16 is a diagram for describing a method for accommodating objects.

Further, with reference to FIG. 16, besides the partition 33, buffer materials 34 are arranged. The buffer materials 34 may be other objects (e.g., food in a packaging container) accommodated in the box 10. Accordingly, it is possible to prevent the bottle 21 from rolling in the width direction of the box 10 and prevent the bottle 21 from colliding with the box 10.

Figure 17:
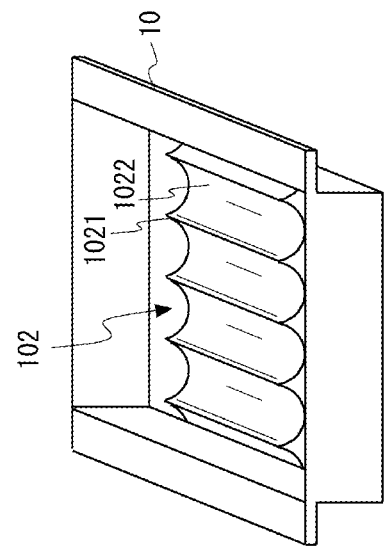
FIG. 17 is a diagram for describing a method for accommodating objects.
Figure 18:
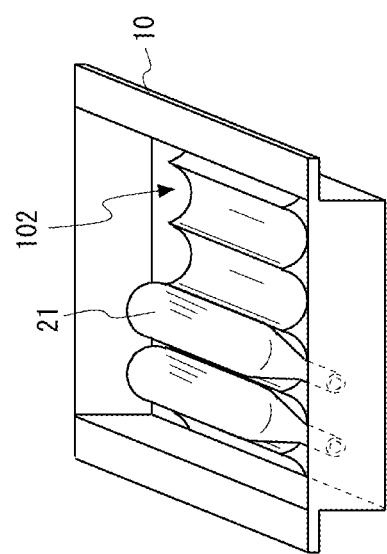
FIG. 18 is a diagram for describing a method for accommodating objects.

With reference to FIG. 17, a board 102 is placed at the bottom of the box 10. On the upper surface of the board 102, convex parts 1021 and concave parts 1022 that are extended in the depth direction of the box 10 are alternately formed in the width direction. With reference to FIG. 18, bottles 21 are arranged along the concave parts 1022 of the board 102. This prevents the bottles 21 from rolling in the width direction of the box 10.

When an object like the bottle 21 that is likely to roll in one direction is conveyed, the object is arranged in such a way that the direction in which the box 10 is conveyed matches the direction in which the object is unlikely to roll (e.g., the longitudinal direction of the bottle 21). In this case, there is a risk that the object might move in the horizontal direction (direction perpendicular to the conveyance direction) and be damaged. By using the board 102, it is possible to reduce the risk that the object might move in the horizontal direction and be damaged. The sorting robot 240 may accommodate the object after the board 102 is placed in the box 10.

Since the change unit 430 of the management server 400 changes the accommodation method, the first maximum allowable acceleration and the second maximum allowable acceleration may be increased. Accordingly, the conveyance robot 300a and the conveyance robot 300b are able to efficiently convey objects while reducing the possibility of the objects being damaged.

Referring next to FIG. 19, a flow of the processing of changing the method for accommodating objects will be described. First, an image of the objects accommodated in the box 10 is captured by the camera 230 and the captured image is recognized, and information on each object in the box 10 (e.g., the material, the shape, and the posture of each object) is acquired (Step S201).

Next, positional relations between each object accommodated in the box 10 and surrounding objects are determined (Step S202). Specifically, objects adjacent to each other in the width direction of the box 10 may be determined and objects adjacent to each other in the depth direction of the box 10 may be determined.

Next, the first calculation unit 410 of the management server 400 determines a damage risk for each of the combinations of the objects (Step S203). Specifically, the first calculation unit 410 determines the damage risk for each of combinations of objects that may collide with each other in the width direction of the box 10. Then, the first calculation unit 410 determines the damage risk for each of combinations of objects that may collide with each other in the depth direction of the box 10.

Next, the first calculation unit 410 calculates the first damage risk and the second damage risk (Step S204). Specifically, the first calculation unit 410 calculates the maximum value of the damage risk for each of combinations of objects that may collide with each other in the width direction of the box 10 as the first damage risk. Then, the first calculation unit 410 calculates the maximum value of the damage risk for each of combinations of objects that may collide with each other in the depth direction of the box 10 as the second damage risk.

Next, the first calculation unit 410 calculates the first maximum allowable acceleration based on the first damage risk and calculates the second maximum allowable acceleration based on the second damage risk (Step S205).

Next, the first calculation unit 410 determines whether or not the first maximum allowable acceleration is equal to or larger than the first reference value and determines whether or not the second maximum allowable acceleration is equal to or larger than the second reference value (Step S206). The first reference value and the second reference value may be values different from each other. By increasing the reference value of the maximum allowable acceleration in the conveyance direction, objects can be conveyed more rapidly. The minimum accelerations that are required to operate the conveyance robots 300a and 300b are set as the first reference value and the second reference value. When the result of the determination is true (YES in Step S206), the processing is ended.

When the result of the determination is false (NO in Step S206), the change unit 430 changes the method for accommodating objects in the box 10 (Step S207). The change unit 430 may add a partition for limiting the movement of objects or change the arrangement of the objects in such a way that the first maximum allowable acceleration becomes equal to or larger than the first reference value and the second maximum allowable acceleration becomes equal to or larger than the second reference value. By changing the arrangement of the objects, objects adjacent to each other are changed, as a result of which the damage risk and the maximum allowable acceleration can be changed. After Step S207 is performed, the process may return to the determination processing in Step S206.

According to the aforementioned processing, the first maximum allowable acceleration and the second maximum allowable acceleration can be made larger, whereby it is possible to convey objects more rapidly while reducing the possibility of the objects being damaged.

In the aforementioned examples, the program includes instructions (or software codes) that, when loaded into a computer, cause the computer to perform one or more of the functions described in the embodiments. The program may be stored in a non-transitory computer readable medium or a tangible storage medium. By way of example, and not a limitation, computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the aforementioned embodiments and may be changed as appropriate without departing from the spirit of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A conveyance system for conveying a box accommodating an object by a conveyance robot, the conveyance system comprising a processing unit configured to:
   calculate, based on a kind and an arrangement of the object, a first maximum allowable acceleration indicating a maximum value of an allowable acceleration of the box in a width direction and a second maximum allowable acceleration indicating a maximum value of an allowable acceleration of the box in a depth direction; and
   change, when the first maximum allowable acceleration is small, a method for accommodating the object in such a way that the first maximum allowable acceleration becomes equal to or larger than a first reference value and the second maximum allowable acceleration becomes equal to or larger than a second reference value which is different from the first reference value, wherein the method for accommodating the object is changed based on information regarding a shape and a material of the object and includes arranging another object or a partitioning member that limits the movement of the object in the box or changes an orientation in which the object is arranged.

2. The conveyance system according to claim 1, wherein the conveyance robot conveys a plurality of boxes, and the processing unit is further configured to calculate, based on the first maximum allowable acceleration and the second maximum allowable acceleration of each of the plurality of boxes, a third maximum allowable acceleration, which is an allowable acceleration of the conveyance robot in a horizontal direction, and a fourth maximum allowable acceleration, which is an allowable acceleration of the conveyance robot in a traveling direction.

3. The conveyance system according to claim 1, wherein the processing unit is further configured to determine a first damage risk indicating a risk that the object might be damaged when the object has moved in the width direction of the box and a second damage risk indicating a risk that the object might be damaged when the object has moved in the depth direction of the box and calculate the first maximum allowable acceleration which is based on the first damage risk and the second maximum allowable acceleration which is based on the second damage risk.

4. A conveyance system for conveying a box accommodating an object by a conveyance robot, the conveyance system comprising:
   a processing unit configured to:
      calculate, based on a kind and an arrangement of the object, a first maximum allowable acceleration indicating a maximum value of an allowable acceleration of the box in a width direction and a second maximum allowable acceleration indicating a maximum value of an allowable acceleration of the box in a depth direction; and
      change, when the first maximum allowable acceleration is small, a method for accommodating the object in such a way that the first maximum allowable acceleration becomes equal to or larger than a first reference value and the second maximum allowable acceleration becomes equal to or larger than a second reference value which is different from the first reference value; and
   a rack that accommodates the box, wherein the rack comprises a sorting robot that accommodates the object in the box by the accommodation method being changed.

5. A conveyance method for conveying a box accommodating an object by a conveyance robot, comprising:
   determining, based on a kind and an arrangement of the object, a first maximum allowable acceleration indicating a maximum value of an allowable acceleration of the box in a width direction and a second maximum allowable acceleration indicating a maximum value of an allowable acceleration of the box in a depth direction; and changing, when the first maximum allowable acceleration is small, a method for accommodating the object in such a way that the first maximum allowable acceleration becomes equal to or larger than a first reference value and the second maximum allowable acceleration becomes equal to or larger than a second reference value which is different from the first reference value, wherein the method for accommodating the object is changed based on information regarding a shape and a material of the object and includes arranging another object or a partitioning member that limits the movement of the object in the box or changes an orientation in which the object is arranged.

6. A non-transitory computer readable medium storing a program for causing a computer to execute the conveyance method according to claim 5.

* * * * *